US011375033B1

(12) United States Patent
Sreenivas Prasad

(10) Patent No.: US 11,375,033 B1
(45) Date of Patent: Jun. 28, 2022

(54) AUTOMATED TUNING OF NETWORK INTERMEDIARY DEVICES

(71) Applicant: Amazon Technologies, Inc., Seattle, WA (US)

(72) Inventor: Arun Kumar Sreenivas Prasad, Ringsend (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/868,478

(22) Filed: May 6, 2020

(51) Int. Cl.
| | |
|---|---|
| *G06F 15/16* | (2006.01) |
| *G06F 15/173* | (2006.01) |
| *H04L 12/741* | (2013.01) |
| *H04L 29/08* | (2006.01) |
| *H04L 12/24* | (2006.01) |
| *H04L 29/12* | (2006.01) |
| *H04L 67/56* | (2022.01) |
| *H04L 67/10* | (2022.01) |

(52) U.S. Cl.
CPC .............. *H04L 67/28* (2013.01); *H04L 67/10* (2013.01)

(58) Field of Classification Search
CPC ................................ H04L 67/28; H04L 67/10
USPC ........................................................ 709/201
See application file for complete search history.

(56) References Cited

U.S. PATENT DOCUMENTS

| | | | |
|---|---|---|---|
| 6,718,358 B1 | 4/2004 | Bigus et al. | |
| 7,380,006 B2 | 5/2008 | Srinivas et al. | |
| 7,693,052 B2 | 4/2010 | Jin et al. | |
| 8,321,583 B2* | 11/2012 | Weston | H04L 47/27 |
| | | | 709/236 |
| 8,467,390 B2 | 6/2013 | Persson et al. | |
| 8,713,565 B2 | 4/2014 | Ashok et al. | |
| 9,053,070 B1 | 6/2015 | Arguelles | |
| 9,485,323 B1* | 11/2016 | Stickle | H04L 67/1031 |
| 9,692,811 B1* | 6/2017 | Tajuddin | G06F 11/3616 |
| 9,883,013 B2* | 1/2018 | Weston | H04L 69/163 |
| 10,524,256 B2 | 12/2019 | Lin et al. | |
| 10,587,720 B2 | 3/2020 | Hui et al. | |
| 10,735,270 B1* | 8/2020 | Whipple | H04L 45/02 |
| 2009/0117895 A1* | 5/2009 | McGuffin | H04L 47/32 |
| | | | 455/431 |
| 2012/0198050 A1* | 8/2012 | Maki | H04L 43/04 |
| | | | 709/224 |
| 2012/0230329 A1* | 9/2012 | Morris | H04L 69/16 |
| | | | 370/389 |
| 2012/0259911 A1* | 10/2012 | Meierer | H04L 67/025 |
| | | | 709/203 |
| 2014/0153387 A1 | 6/2014 | Wu et al. | |
| 2015/0012661 A1* | 1/2015 | Elmore | H04L 67/2842 |
| | | | 709/231 |

(Continued)

OTHER PUBLICATIONS

Aws, "Elastic Load Balancing User Guide", Copyright 2020 Amazon Web Services, Inc., pp. 1-27.

*Primary Examiner* — David R Lazaro
*Assistant Examiner* — Berhanu Shitayewoldetadik
(74) *Attorney, Agent, or Firm* — Robert C. Kowert; Kowert, Hood, Munyon, Rankin & Goetzel, P.C.

(57) ABSTRACT

An intermediary device configured for request and response traffic of an application detects an unadvertised network parameter setting of an implementation node of the application. Based on the detected setting, the intermediary device computes a new value for a networking parameter of the intermediary device, and sets the parameter to the new value.

20 Claims, 11 Drawing Sheets

(56) References Cited

U.S. PATENT DOCUMENTS

| | | | |
|---|---|---|---|
| 2015/0085665 A1 | 3/2015 | Kompella et al. | |
| 2015/0089034 A1* | 3/2015 | Stickle | H04L 41/28 709/223 |
| 2015/0117506 A1* | 4/2015 | Simpson | H01P 1/15 375/228 |
| 2015/0319063 A1* | 11/2015 | Zourzouvillys | H04L 65/80 370/352 |
| 2015/0334724 A1* | 11/2015 | Faccin | H04W 28/085 370/235 |
| 2016/0183168 A1* | 6/2016 | Horn | H04W 48/14 709/225 |
| 2016/0330108 A1* | 11/2016 | Gillon | H04L 65/80 |
| 2016/0330286 A1* | 11/2016 | Keith | H04L 67/327 |
| 2017/0048328 A1* | 2/2017 | Korotaev | H04L 69/16 |
| 2017/0230451 A1* | 8/2017 | Paramasivam | H04L 67/1006 |
| 2017/0251449 A1* | 8/2017 | Malik | H04W 56/0065 |
| 2018/0143897 A1* | 5/2018 | Shani | G06F 11/3688 |
| 2018/0351816 A1* | 12/2018 | Li | H04L 67/10 |
| 2019/0028560 A1* | 1/2019 | Holland | H04L 41/14 |
| 2019/0163544 A1* | 5/2019 | Ekambaram | H04L 67/12 |
| 2020/0351643 A1* | 11/2020 | Dhanapal | H04B 7/0628 |
| 2021/0014234 A1* | 1/2021 | Kwatra | H04W 76/11 |
| 2021/0220208 A1* | 7/2021 | Shibata | G08B 21/0423 |
| 2021/0227042 A1* | 7/2021 | Sawant | H04L 67/16 |

\* cited by examiner

Scenario 251: AIN initial congestion window = 1, TPID initial congestion window = 1

Scenario 252: AIN initial congestion window = 3, TPID initial congestion window = 1

AUTOMATED TUNING OF NETWORK INTERMEDIARY DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed computing environment may provide remote clients with access to various network-accessible services, which can all be accessed over network connections. In some cases, a given network-accessible service may be implemented at numerous nodes, which are accessed by the remote clients via intermediary devices such as load balancers. Some applications implemented at a distributed computing environment may comprise multiple computing and/or storage nodes arranged in graphs or pipelines, with a given client request being processed using several different messages sent among the pipeline nodes. In some scenarios, respective subsets of the nodes involved in processing a given request may be administered by different entities. For example, nodes of a virtualized computing service, used to implement the business logic of an application may be administered by an application owner, while front-end load balancers used to distribute client requests among the computing nodes may be administered independently by a load balancing service.

Figure 1:
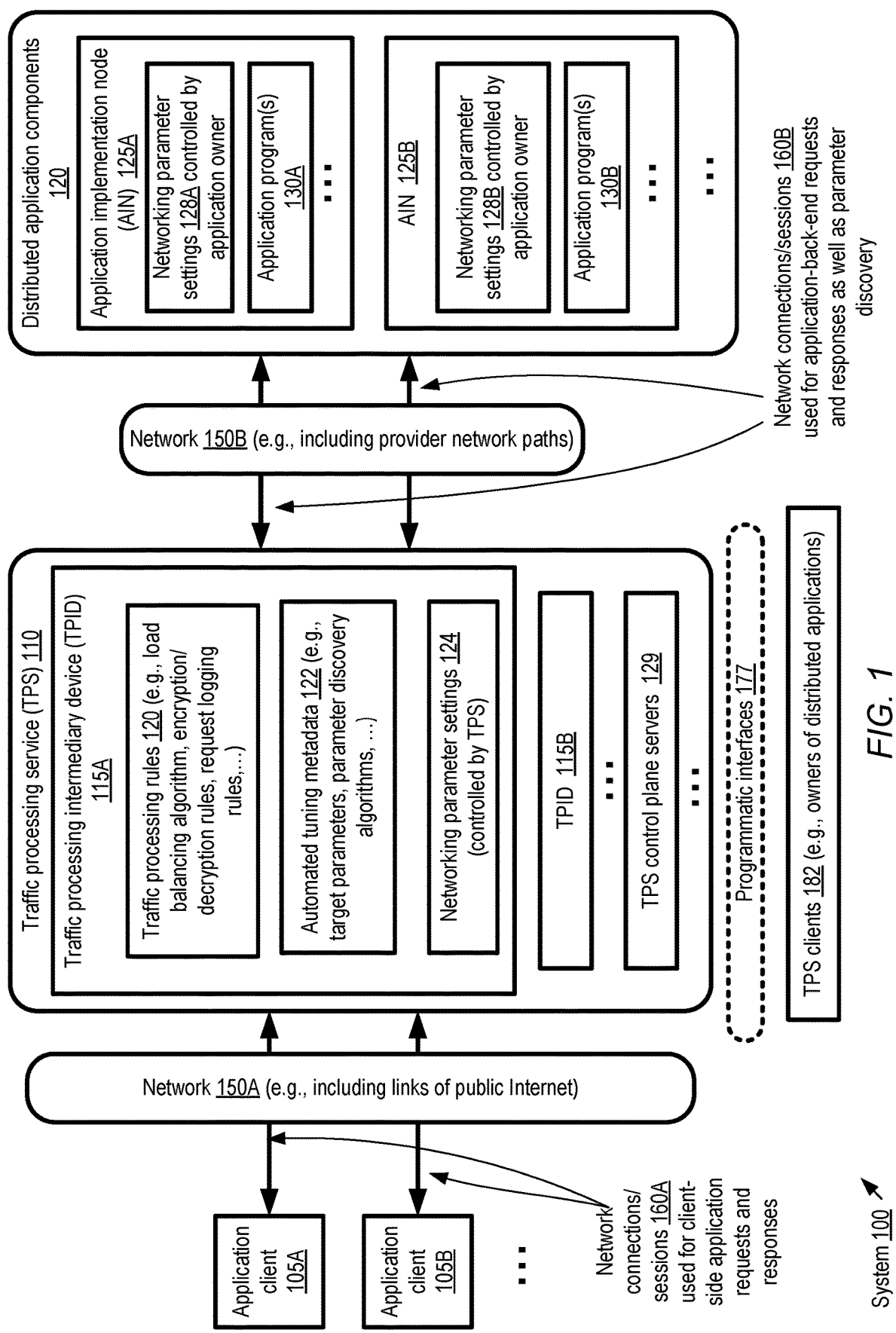
FIG. 1 illustrates an example system environment in which networking configuration settings may be tuned automatically at a traffic processing service based on discovered values of networking configuration settings of application nodes, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for automated tuning of networking configuration settings at network intermediary devices such as load balancers of a distributed computing environment, based on discovery of unadvertised configuration settings at other components of the distributed computing environment such as back-end nodes of distributed applications for which the network intermediary devices are configured. Key aspects of client-perceived application performance, such as the response times for HTTP (Hypertext Transfer Protocol) requests submitted by clients, may be affected substantially by networking configuration settings (including Transmission Control Protocol (TCP) congestion control parameter settings, HTTP connection keepalive settings, etc.) at the various resources involved in the processing of the clients' requests. For some application deployed in a provider network or cloud computing environment, resources of multiple independently-administered services may be used for a given distributed application. For example, compute instances of a virtualized computing service may be used to implement the back-end logic of a distributed application, while a set of load balancers of a load balancing service may be configured to distribute incoming application requests among the compute instances. The front-end load balancers may obtain requests from clients using a first set of client-side network connections, and may transmit internal messages comprising the client requests to back-end servers using a different set of network connections. Application owners may be able to tune configuration settings of the compute instances, but at least some configuration settings of the load balancers may not be modifiable by the application owners. As a result, it may sometimes be the case that while configuration settings at some subset of resources have been adjusted by administrators, configuration settings at other resources involved in the request processing workflow have not been adjusted accordingly, leading to sub-optimal overall performance. Furthermore, at least some important configuration settings such as the initial congestion window parameters are not advertised during connection setup procedures and are not included in packet headers, so discovering the current values of such settings may itself require non-trivial effort.

According to the novel performance tuning techniques described herein, in various embodiments network intermediary devices configured for an application may implement discovery algorithms to detect unadvertised values of at least some performance-critical parameters of back-end application implementation nodes. Based at least in part on the detected values, a given intermediary device may automatically adjust one or more of its own configuration settings, even in scenarios in which the application owners have no direct control over the configuration settings being modified, and in which the administrators of the intermediary devices do not send requests specifying target settings to the intermediary devices. As a result, overall application performance as perceived by clients may be improved substantially in at least some embodiments—for example, depending on the adjusted settings and the total size of the web page being requested, the time taken to render a web page at a client's may be reduced by a factor of two or more in some cases. In addition, error messages which might otherwise be sent to application clients (e.g., due to dropped request messages and the like) may be avoided. Furthermore, the intermediary device may continue to check for changes to parameters at the back-end nodes over time in at least some embodiments, adjusting its own parameters to further optimize performance as and when additional changes are applied at the back-end nodes.

As one skilled in the art will appreciate in light of this disclosure, certain embodiments may be capable of achieving various advantages, including some or all of the following: (a) enhancing responsiveness and other performance metrics of distributed applications implemented for which intermediary devices such as load balancers are employed, (b) improving the user experience of application clients as well as application administrators, by reducing the number of errors and/or (c) reducing the amount of computation, memory, storage, and other resources which may have to be deployed at customer support organizations responsible for responding to client complaints about application performance and/or error messages.

In some embodiments, the automated parameter discovery and tuning techniques indicated above may be implemented at one or more network-accessible services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a parameter tuning service or a network intermediary service at which parameters are tuned automatically. A VCS may also be referred to as an elastic compute service, virtual machines service, computing cloud service, compute engine, and/or cloud compute in various implementations.

According to some embodiments, a system may comprise one or more computing devices. The computing devices may include instructions that upon execution on or across the one or more computing devices cause the one or more computing devices to assign one or more intermediary devices for processing network traffic of an application comprising one or more application implementation nodes. A given intermediary device may be configured to perform a variety of functions for the application in some embodiments, including but not limited to: (a) obtaining, via a first set of one or more network connections, one or more operation requests originating at a client of the application, (b) transmitting, via a second set of one or more network connections, one or more messages representing an operation request of the one or more operation requests to at least one application implementation node and (c) transmitting, to the client via the first set of one or more network connections, one or more messages comprising a response generated to an operation request at an application implementation node. The intermediary device may obtain an indication that it (the intermediary device) is to perform automated tuning of one or more networking parameters in at least some embodiments, e.g., from a control plane or administrative component of a network-accessible service of a provider network. The intermediary device may identify, in response to the indication, a respective unadvertised value of one or more networking parameters of at least a particular application implementation node. The values may be deemed to be unadvertised in that they may (a) not be indicated in messages comprising responses to the operation requests and (b) not be indicated in a connection establishment workflow used for the second set of connections. Having identified an unadvertised value of a particular parameter, the intermediary device may compare the identified value with a value of a corresponding networking parameter of the intermediary device itself. Based at least in part on a result of the comparison, the intermediary device may modify the corresponding networking parameter without receiving a request to perform the modification, and transmit one or more network messages in accordance with the automatically modified parameter.

In some embodiments, the permissions/privileges required to make changes of configuration settings of the application implementation nodes may differ from the permissions/privileges required to make changes of configuration settings of the intermediary devices. This may be the case if, for example, a different provider network service is used for the intermediary devices than is used for the application implementation nodes, or if a different client account is associated with the intermediary devices than with the application implementation nodes.

Any of a number of different kinds of unadvertised networking configuration parameters at various layers of the networking software/hardware stacks of the application implementation nodes may be detected in various embodiments by the intermediary devices, such as congestion control parameters (including TCP parameters such as initial congestion windows), connection timeout parameters (such as HTTP keepalive timeouts), request throttling parameters (e.g., parameters indicating the maximum number of requests an application implementation node is configured to accept within a short time interval, before the application implementation node starts dropping new requests), and so on. In some embodiments, the parameter which is modified at the intermediary device may be the same as the parameter whose value is detected; in other embodiments, the intermediary device may learn the value of one parameter and modify a different parameter. In some embodiments, when modifying the value of the same parameter whose value was detected, the intermediary node may set its own value of the parameter to exactly the same value as that of the application implementation node (e.g., if the TCP initial congestion window of the application implementation node is set to 3, the value of the TCP initial congestion window of the intermediary node may also be set to 3). In other embodiments, the modified version of the intermediary device's parameter may not necessarily be set to match the detected value of the same parameter at the application implementation node.

Depending for example on the particular unadvertised parameter being considered as an auto-tuning candidate, any of a number of different techniques may be used to discover its value. For example, to discover the TCP initial congestion window parameter, the intermediary device may compute a number of additional network messages which are transmitted by the application implementation node to the intermediary device (a) after the application implementation node sends a particular network message to the intermediary device and (b) before the particular application implementation node re-sends the particular network message to the intermediary device as a result of an absence of an acknowledgement of the particular network message from the intermediary device. In some embodiments, the intermediary device may be configured to implement a health checking protocol, in which the intermediary device sends health status probes at various intervals to the application implementation nodes, and a modified version of such a health status probe may be used to detect at least some parameters. To detect a keepalive timeout, the intermediary device may simply not send any messages after establishing a connection with an application implementation node, and wait until the application implementation node terminates the idle connection in one embodiment. To detect a throttling parameter, the intermediary device may submit progressively larger bursts of fake or simulated client requests to an application implementation node, and determine or estimate the throttling parameter based on the number of responses received.

In at least some embodiments, the automated discovery and self-tuning of networking parameters may be conducted by an intermediary device may be triggered by a programmatic request submitted by a client of a network-accessible service. In various embodiments, an intermediary device may comprise a load balancer, a content server of a CDN (content delivery network), or a sidecar proxy assigned to process requests transmitted between constituent services of an application implemented using a service-oriented architecture (SOA).

An intermediary device may detect mismatches between parameter settings of a plurality of application implementation nodes in some embodiments, and cause the application owner to be informed regarding the mismatch. For example, if the value of a particular parameter P1 is set to V1 at one action implementation node AIN1 of a group of nodes (expected to be configured identically to one another), but the value of P1 is set to V2 (different from V1) at another action implementation node AIN2, the intermediary device may discover the discrepancy and generate a message for the application owner. In one embodiment, in which several different intermediary devices (such as a collection of load balancers) are configured for the same application, a given intermediary device may cause parameters at other intermediary devices to also be changed, in addition to modifying its own parameters.

Example System Environment

FIG. 1 illustrates an example system environment in which networking configuration settings may be tuned automatically at a traffic processing service based on discovered values of networking configuration settings of application nodes, according to at least some embodiments. As shown, system 100 may include resources and artifacts of a traffic processing service (TPS) 110 and components 120 of a distributed application. The TPS 110 may comprise a plurality of traffic processing intermediary devices (TPIDs) 115, such as TPID 115A and TPID 115B, as well as TPS control plane servers 129 responsible for administrative tasks such as assignment/allocation of TPIDs to various distributed applications. TPIDs 115 may be configured to perform any of several different types of traffic processing for network messages transmitted in either direction between application clients 105 (e.g., 105A or 105B) and the application implementation nodes (AINs) 125 (e.g., 125A or 125B). Examples of such traffic processing tasks may include load balancing application operation requests, encrypting/decrypting messages, logging requests, transforming requests (or responses generated for the client requests at the AINs) from one format or networking protocol to another, implementing encapsulation protocols, and the like in different embodiments. In one simple scenario in which a TPID 115 is configured primarily as a load balancer, an application client 105 may submit an application request to the TPID 115, and the TPID may submit a corresponding internal request (also referred to as a back-end request) to a particular AIN 125 selected based on a load balancing algorithm indicated in rules 120. When the application programs 130 (e.g., 130A or 130B) at the AIN 125 completes the requested operations, a response message may be sent to the TPID 115, and the TPID may send a corresponding response message to the client 105.

In at least some embodiments, the TPIDs 115 may utilize two sets of network connections or sessions. Network connections 160A may be used by application clients 105A to send messages, comprising requests for operations to be performed at the distributed application, to the TPS 110 over a first network 150A (which may, for example, comprise portions of the public Internet) in the depicted embodiment. These connections 160A may also be used by the TPIDs to send response messages (containing responses to, or results of, the requested operations) back to the application clients. Messages transmitted by the TPIDs to the application clients (and to the AINs 125) may be sent in accordance with networking parameter settings 124 of the TPIDs. Initial values of the TPID networking parameters may be chosen by the TPS control plane servers 129 in at least some embodiments.

Network connections 160B may be used for messages transmitted between the TPIDs 115 and the AINs 125 over a second network 150B. Such messages may comprise application back-end requests and responses, corresponding to the client-side requests and responses which are transferred over network 150A. In the depicted scenario, network 150B may include private network pathways of a provider network or cloud computing environment, and may not include links of the public Internet. In at least some embodiments, the TPIDs and the AINs may be implemented using services of such a provider network—e.g., individual TPIDs may comprise load balancers of a load balancing service of the provider network, while individual AINs may comprise compute instances of a virtualized computing service of the provider network. In at least some implementations, individual ones of the TPIDs 115 may be implemented using some combination of firmware, software and hardware at respective physical hosts, and individual ones of the AINs 125 may also be implemented using some combination of firmware, software and hardware at respective physical hosts. In other implementations, multiple TPIDs 115 and/or multiple AINs 125 may be implemented at a given computing device such as a server. The flow of network traffic between the TPIDs 115 and the AINs 125 may be governed by networking parameter settings 128 (e.g., 128A or 128B) of the AINs, as well as the networking parameter settings 124 of the TPIDs. In some implementations, TCP may be used for at least some connections 160A and/or at least some connections 160B. In other implementations, other networking protocols may be used.

In some cases, as discussed below in further detail, one or more networking parameters 124 (such as TCP initial congestion window sizes, HTTP keepalive timeouts, etc.) may happen to be set in a sub-optimal way with respect to the current settings of the networking parameters 128 at some or all of the AINs at various points in time; for example, the combination of settings may result in unnecessarily long response times (or unnecessarily low throughputs) for application requests as perceived by the application clients 105, or may result in timeout-related errors. Different sets of permissions may be needed to alter the networking configuration settings 128 than are needed to alter the networking configuration settings of the TPIDs in at least some embodiments. For example, networking parameter settings 128 may be altered if desired by the owners/administrators of the distributed application components 120, while permissions to alter the networking parameters 124 of the TPIDs may not be granted to the application owners. Instead, networking configuration settings 124 may be modified, if needed, by the TPIDs themselves and/or by the TPS control plane servers 129 in the depicted embodiment. In order to mitigate or avoid sub-optimal application performance, the TPIDs 115 may auto-tune their networking parameters 124 in at least some embodiments, e.g., based on detected values of unadvertised networking parameter settings 128.

The TPS 110 may implement a set of programmatic interfaces 177 in the depicted embodiment, such as web-based consoles, command-line tools, graphical user interfaces, application programming interfaces (APIs) and the like. Interfaces 177 may be used by TPS clients 182 such as the owners/administrators of the distributed applications implemented at the AINs 125, e.g., to request the allocation of TPIDs for the applications, to indicate the kinds of traffic processing rules 120 to be implemented by the TPIDs, and so on. In response to a request submitted by a TPS client via programmatic interfaces 177, a TPS control plane server 129 may assign one or more TPIDs 115 for processing network traffic of an application comprising one or more AINs 125.

In at least some embodiments, a TPID 115 may obtain an indication, e.g., in the form of a message or command issued by the TPS control plane servers 129, that automated tuning of one or more networking parameters is to be performed. The TPS control plane servers may send such indications to the TPID in response to auto-tuning requests received from TPS clients 182 via programmatic interfaces 177 in one embodiment. In some implementations, such messages or commands from the TPID control plane servers to the TPIDs may not be required to trigger auto-tuning; instead, for example, the TPIDs may each be provided automated tuning metadata 122 as part of a default TPID initialization procedure. The auto-tuning metadata 122 may indicate, for example, the set of target parameters to be tuned, the discovery algorithms or techniques to be used to detect the values of relevant networking configuration parameters 128 of the AINs, and so on. In embodiments in which the TPS control plane sends messages/commands to the TPIDs to initiate or modify auto-tuning procedures, the automated tuning metadata 122 may be stored in response to such messages/commands.

Based on a message from the TPS control plane servers and/or the automated tuning metadata 122, the TPID 115 may identify respective unadvertised values of one or more networking parameters of at least a particular AIN 125. The values may be described as being unadvertised values in that they are (a) not indicated in messages sent by the AINs to the TPS, comprising responses to operation requests and (b) not indicated in a connection establishment workflow used for establishing connectivity between the TPID and the AINs. The TPID 115 may use the detected values of AIN networking parameters to determine whether any of its own networking parameters should be modified (e.g., by comparing the AIN's value for a parameter with the TPID's value) in various embodiments. If the TPID determines that its parameters should be changed, the TPID may automatically modify the parameters, without receiving a request indicating the specific values to which the parameter should be set, or even a request to modify the parameter in the depicted embodiment. After the value of the parameter(s) have been automatically adjusted, subsequent network messages/packets may be transmitted by the TPID in accordance with the modified values. The adjustments may help to improve application performance as perceived by clients 105, and/or may reduce error messages caused by unnecessary timeouts and the like.

In some embodiments, a TPID 115 may also perform other networking configuration-related tasks. For example, in one embodiment, the TPID may discover the respective values of a particular parameter setting from multiple AINs 125, and generate a report for the application owner (e.g., TPS client 182) indicating whether the values do not match or should be modified to improve performance or decrease errors. In one embodiment, when a given TPID chooses a new value for one of its own parameters, it may notify other TPIDS which are also assigned to the same application regarding the chosen value, in effect requesting the other TPIDs to change their parameters as well.

Initial Congestion Window Settings Example

Figure 2:
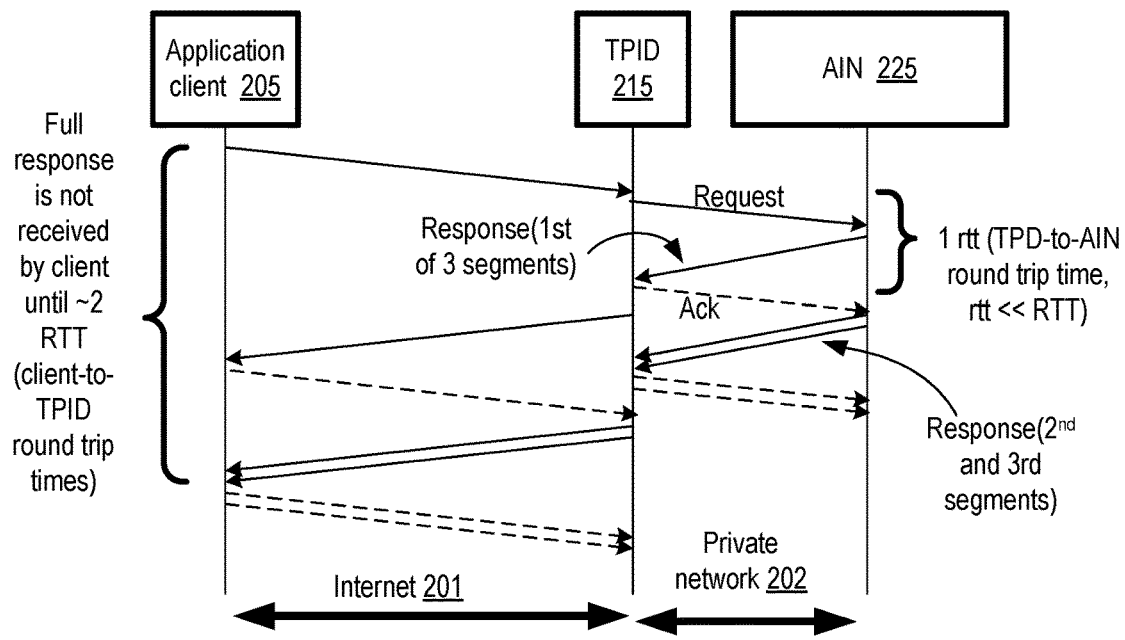
FIG. 2 illustrates an example scenario in which the modification of a networking configuration setting at an application implementation node may not impact overall application performance, according to at least some embodiments.
Figure 2:
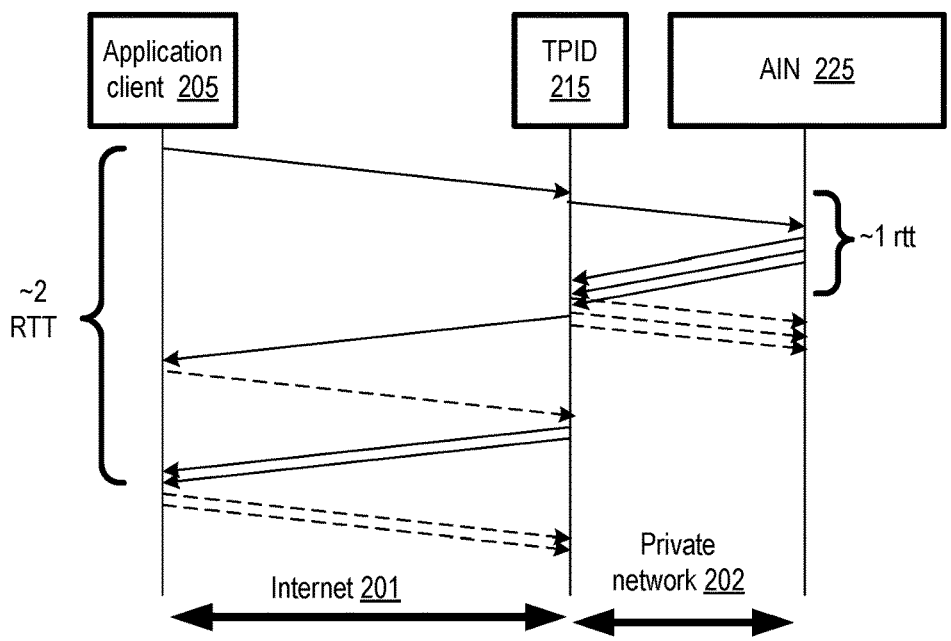

In some cases differences in parameter settings between TPIDs and AINs may result in sub-optimal performance, and making changes at the AINs alone may be insufficient to resolve the performance problems. FIG. 2 illustrates an example scenario in which the modification of a networking configuration setting at an application implementation node may not impact overall application performance, according to at least some embodiments. In scenario 251, TCP is used for connections established between application clients 205 and TPIDs 215, and also for connections established between TPIDs 215 and AINs 225 of a distributed application. The TCP initial congestion window size ("initcwnd", an unadvertised parameter) at AIN 225 is set to one, and the value of the TCP initial congestion window size at the TPD is also set to one. The owner of the application can make changes to initcwnd at the AINs, but is assumed to be unable to make changes to initcwnd at the TPIDs.

Assume that application requests (such as HTTP GET requests) in the embodiment depicted in FIG. 2 are sent over Internet links 201, and messages between TPID 215 and AIN 225 are sent over a private network 202. Assume further that a given application request can be sent using a single network packet or segment, but that the response requires a total of three packets or segments.

The client 205 sends an application request message to the TPID, and the TPID in turn sends a corresponding request message to the AIN 225. Because the initial congestion window is 1, the AIN only sends the first of the three segments of the response to the TPID, and waits for an acknowledgement (Ack) from the TPID 215 before sending the remaining two segments. Acknowledgement messages are shown using dashed lines in FIG. 2 and FIG. 3. The AIN is assumed to adjust its congestion window to two after receiving the first acknowledgement from the TPID. The time between the sending of the request message from the TPID 215 to the AIN 225, and the reception of the first response segment at the TPID 225, is referred to as TPID-to-AIN round-trip-time rtt in FIG. 2. The second and third response segments are sent close together in time from the AIN to the TPID, and the corresponding acknowledgements are also received close together in time at the AIN.

When the TPID 215 receives the first response segment from AIN 225, it sends the contents of the response on to the client 205 in a message over the Internet 201. Because of the initial congestion window of one, the TPID also has to wait until it receives an acknowledgement from the client 205, before sending the next two response segments on to the client. The full response (all three segments) is not available at the client until approximately two client-to-TPID round-trip-times (RTTs) in scenario 251. Note that because messages between the TPID and the client are sent over the Internet, while messages between the TPID and the AIN are sent over a private network, it may be the case that the client-to-TPID round trip time (RTT) may be much greater than the TPID-to-AIN round trip time (rtt).

In an attempt to improve the response times as perceived by the client, the application owner may increase the initcwnd value to (for example) three, as shown in scenario 252 of FIG. 2. If such a change is made only at the AIN, however, this may not help overall performance much as long as the TPD's initcwnd value remains set to one. Even though the AIN is able to send all three segments of the response to the TPD in scenario 252 as soon as the request is received at the AIN, the TPID is still only able to send the first segment and then wait for an acknowledgement from the client before sending the remaining two segments to the client. As a result, the overall response time for the application client remains approximately two RTTs, despite the attempts of the application owner to improve the response times by adjusting initcwnd.

Figure 3:
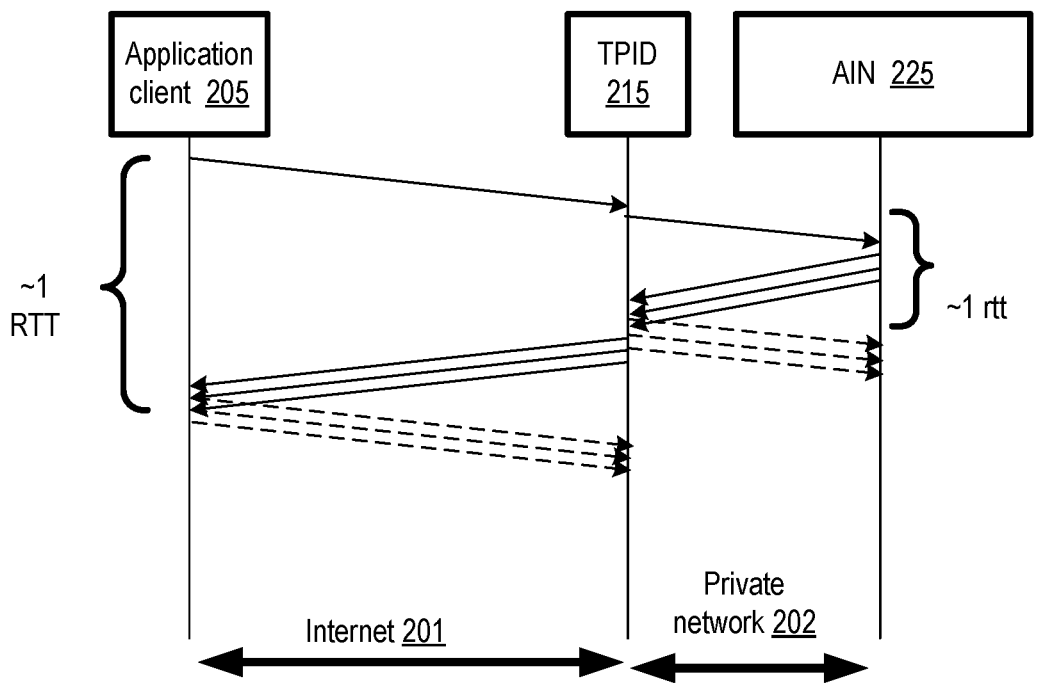
FIG. 3 illustrates an example scenario in which overall application performance may be improved when an intermediary device automatically adjusts a networking configuration parameter setting to match a corresponding setting at an application implementation node, according to at least some embodiments.

FIG. 3 illustrates an example scenario in which overall application performance may be improved when an intermediary device automatically adjusts a networking configuration parameter setting to match a corresponding setting at an application implementation node, according to at least some embodiments. In Scenario 253 of FIG. 3, the TPID 215 has ascertained the value of the unadvertised parameter initcwnd is three, and has automatically adjusted its own value of initcwnd to three. As a result, as soon as the second and third of the three segments of the response are received at the TPID 215 from the AIN 225, the TPID is able to immediately send on the segment contents to the client 205 without waiting for an acknowledgement for the first segment. The response time perceived by the client is now approximately one RTT instead of the two-RTT response time of scenario 252. Note that the impact of auto-tuning initcwnd at the TPID to match the initcwnd value of the AIN may vary based on the average size (in segments) of the response messages relative to the initcwnd value selected.

Example Techniques for Detecting Values of Unadvertised Parameters

Figure 4:
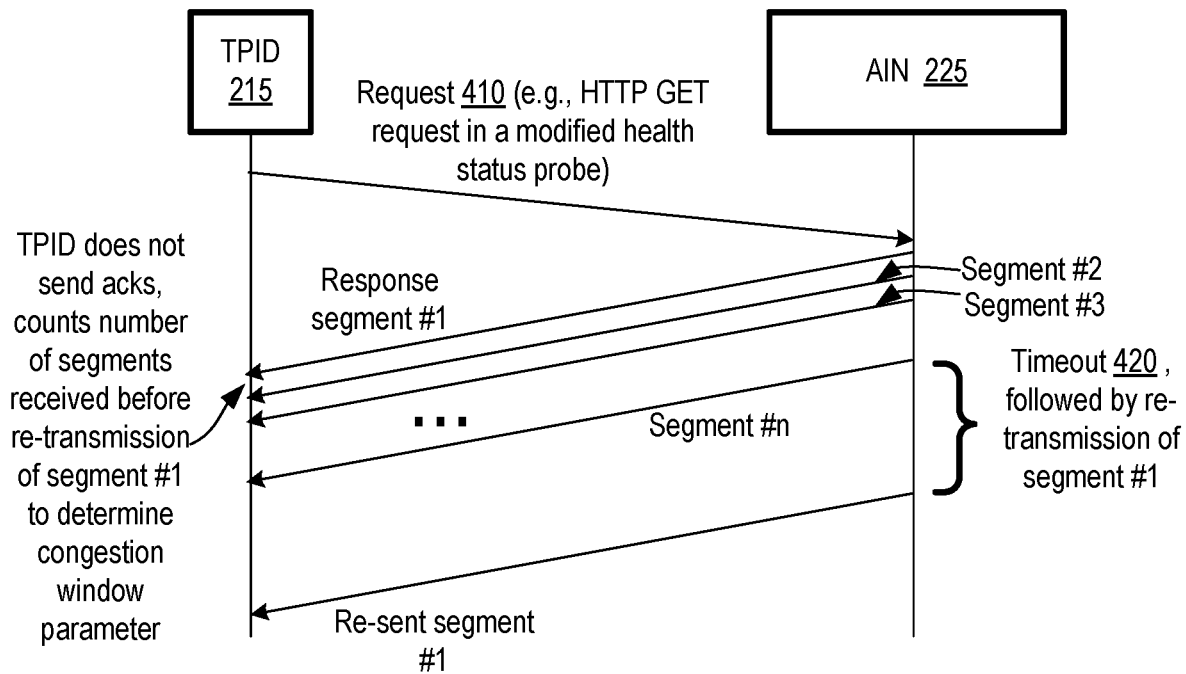
FIG. 4 illustrates an example technique which may be used by a traffic processing intermediary device to discover an unadvertised value of a congestion window parameter of an application implementation node, according to at least some embodiments.

FIG. 4 illustrates an example technique which may be used by a traffic processing intermediary device to discover an unadvertised value of a congestion window parameter of an application implementation node, according to at least some embodiments. As part of its regular responsibilities, unrelated to auto-tuning of networking parameters, TPID 215 may be configured to monitor the health status of one or more AINs 215 in the depicted embodiment. In order to check on the health state of the AIN 225, the TPID may send health status probes periodically to the AIN, and monitor the time taken to get a response to get responses to the health status probes. In some implementations, for example, a given health status probe may comprise an HTTP GET request for a particular data item. If the response to the HTTP GET request is received within a pre-selected time interval, the AIN may be considered healthy; if no response is received in the time interval, the AIN may be suspected of being unhealthy.

The health monitoring protocol may be modified slightly as follows in the depicted embodiment to determine the setting of the TCP initial congestion window. Instead of the regular health status probe, a modified GET request 410 may be sent to the AIN 225, in which a large data object which requires multiple response segments may be requested. The AIN 225 may start sending response segments, such as segment #1, segment #2, segment #3 and so on; the number of segments sent before it is required to receive an acknowledgement may be dependent on the AIN's initcwnd setting. Instead of the default behavior of immediately sending an acknowledgement message as soon as each response segment is received, the TPID 215 may send no acknowledgement messages to the response segments in the depicted embodiment.

After the AIN 225 has sent initcwnd response segments to the TPID, the AIN may wait for an acknowledgment of the first segment. Because no acknowledgements are sent by the TPID, the AIN 225 may eventually time out while waiting for the first segment's acknowledgement, as indicated by label 420, and re-transmit the first segment. By counting the number of segments the AIN sent without waiting for an acknowledgement for the first segment, the TPID may be able to deduce the value of initcwnd at the AIN in the depicted embodiment. The TPID may then decide to set its own initcwnd parameter, e.g., to match the initcwnd setting of the AIN if it does not already match, as discussed earlier. The type of parameter discovery technique shown in FIG. 4 may be performed periodically by the TPID in the depicted embodiment, because the AIN's initcwnd value may be changed at any time by the AIN's administrator or application owner.

Figure 5:
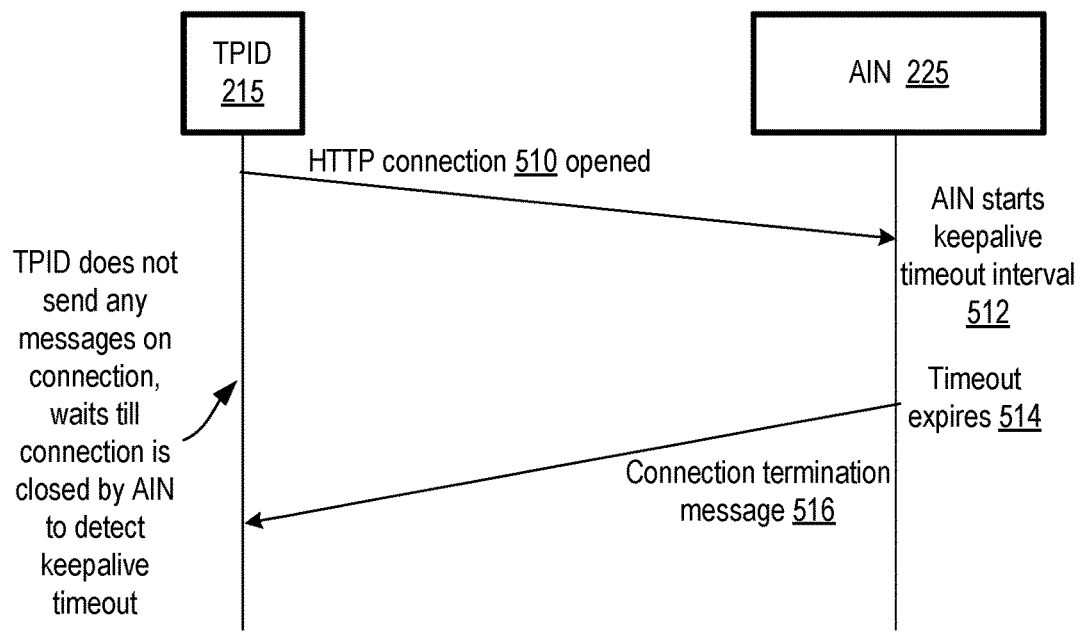
FIG. 5 illustrates example techniques which may be employed by a traffic processing intermediary device to discover unadvertised values of keepalive timeout settings and request throttling settings, according to at least some embodiments.
Figure 5:
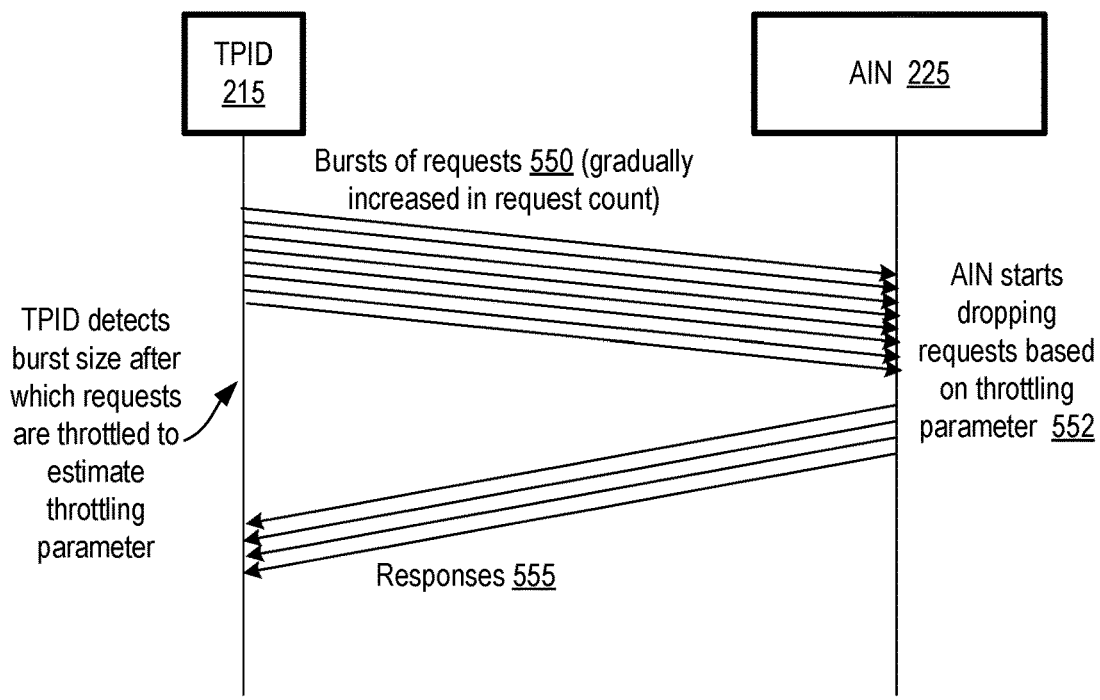

In addition to initcwnd, values of other unadvertised parameters may also be discovered by a TPID in various embodiments. FIG. 5 illustrates example techniques which may be employed by a traffic processing intermediary device to discover unadvertised values of keepalive timeout settings and request throttling settings, according to at least some embodiments. In the depicted embodiment, clients send HTTP requests via the TPID 215 to an AIN, and HTTP keepalive is assumed to be enabled. If an AIN's keepalive timeout is shorter than that of the TPID, a client's request may be accepted by the TPID, but the corresponding internal request sent by the TPID to the AIN may be rejected due to a timeout at the AIN. This may result in undesired HTTP error messages (e.g., "gateway timeout" or "bad gateway" error messages) being sent to the client.

To discover an HTTP keepalive timeout interval setting, a TPID may periodically establish an HTTP connection 510, and then not send any data packets on the connection. The AIN may start its timeout interval 512 when the connection is opened. Because the connection remains idle, the timeout may expire 514, and a connection termination message 516 may be sent by the AIN 225 to the TPID. The TPID may estimate the keepalive timeout parameter based on the time between the sending of the request 510 for opening the connection, and the time at which the connection termination message 516 is received at the TPID in the depicted embodiment. The TPID may then adjust its own keepalive timeout accordingly (e.g., by setting it to the same value as that of the AIN, or to a value slightly less than that of the AIN). By making such adjustments, the number of error messages (received by clients) which result from keeping the TPID's keepalive timeout longer than the keepalive timeout of the AIN may be prevented in at least some embodiments.

In some cases, an AIN may enforce workload throttling policies, in which for example the number of requests processed at the AIN within a given time interval is kept below a threshold, and requests which would lead to exceeding the threshold are dropped or rejected. It may be desirable for a TPID to discover such throttling threshold parameters and adjust its own workload management parameters accordingly in some embodiments. To detect throttling parameters, in some embodiments a TPID 215 may send a series of bursts of application requests 550 (with each burst comprising multiple requests sent nearly simultaneously) to an AIN, e.g., during a time period in which the client-submitted request rate is low, and examining the responses sent by the AIN. The number of requests in successive bursts may be increased until the TPID is able to detect that some of the requests are being rejected or dropped by the AIN based on the throttling parameter 552. The TPID may be able to estimate the throttling parameter in the embodiment depicted in FIG. 5 by identifying the smallest burst size which led to dropped requests, and the number of responses 555 which were received for that burst. If a burst of 80 requests over T milliseconds resulted in only 64 responses, for example, with the remaining requests either explicitly rejected or assumed to be dropped, the throttling threshold may be deduced to be approximately 64/T requests per millisecond.

Example Propagation of Discovered Parameter Information

Figure 6:
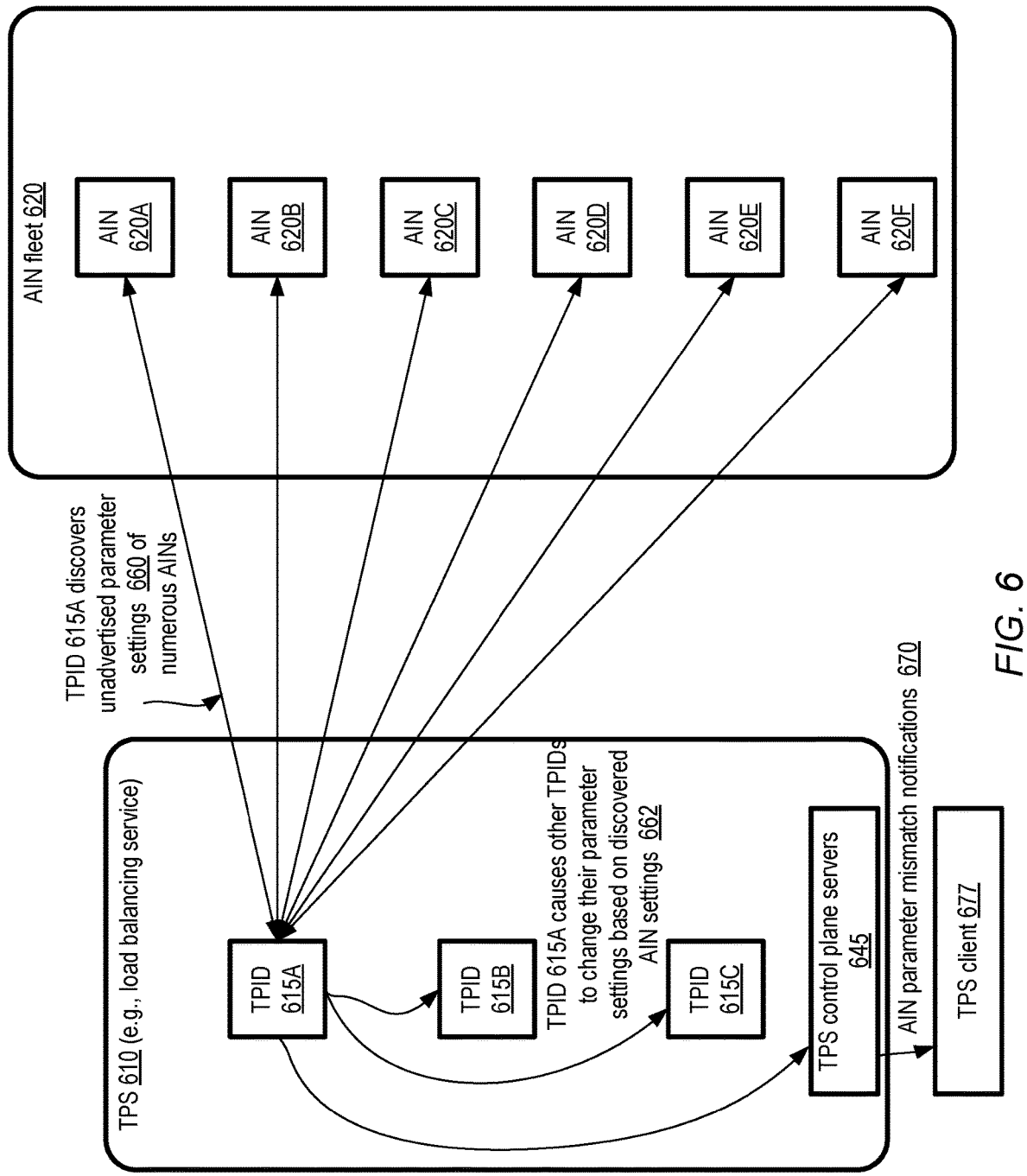
FIG. 6 illustrates an example scenario in which a traffic processing intermediary device may compare discovered networking configuration settings of several application implementation nodes and take actions based on the results of the comparison, according to at least some embodiments.

FIG. 6 illustrates an example scenario in which a traffic processing intermediary device may compare discovered networking configuration settings of several application implementation nodes and take actions based on the results of the comparison, according to at least some embodiments. A TPS 610, similar in functionality to TPS 110 of FIG. 1, may comprise TPIDs 615A, 615B and 615C configured to process network traffic associated with a fleet 620 of AINs, including AINs 620A-620F in the depicted scenario. Using the kinds of discovery mechanisms discussed above, a given TPID such as 615A may discover respective values of one or more unadvertised networking parameters of AINs 615A-615F. In some embodiments, one of the TPIDs of a fleet of TPIDs configured for a given distributed application may be designated as the primary discoverer of AIN parameters, so that all the TPIDs do not have to attempt to discover values of the same AIN parameters unnecessarily. In another approach which may be employed in some embodiments, individual TPIDs may be assigned the responsibility of detecting parameter values at respective subsets of an AIN fleet—e.g., TPID 615A may discover parameter values of AINs 620A and 620B, TOID 615B may discover parameter values of AINs 620C and 620D, and so on.

After TPID 615A implements discovery procedures and detects the parameter settings at the various AINs, it may take two types of actions in addition to adjusting its own parameters in some embodiments. First, TPID 615A may share the discovered values with other TPIDs such as 615B and 615C, potentially causing them to change their own respective parameters 662. Second, in at least one embodiment, TPID 615A may send values of the AIN parameters to the TPS control plane 645. The TPS control plane servers may in turn send notifications 670 to the TPS client 677 on whose behalf the TPIDS are configured (e.g., the owner/administrator of the application implemented using AINs 620D) indicating if the discovered values for a given parameter differ from each other among the AINs 620. In some embodiments, the TPS client 677 may send requests to the TPS control plane servers 645, requesting that the client be informed regarding such mismatches, and the notifications 670 may be sent in response to such requests. Note that in some cases the fact that a given parameter has different settings at respective AINs need not necessarily represent a problem: for example, different AINs may have different performance capacities, so different parameters may be appropriate. The mismatch notification mechanism may nevertheless be helpful to some TPS clients in at least some embodiments, e.g., to help detect scenarios in which some AINs' parameters were tuned by the TPS client while other AINs' parameters were inadvertently left un-tuned.

Example Use of Auto-Tuning at Sidecar Proxies

Figure 7:
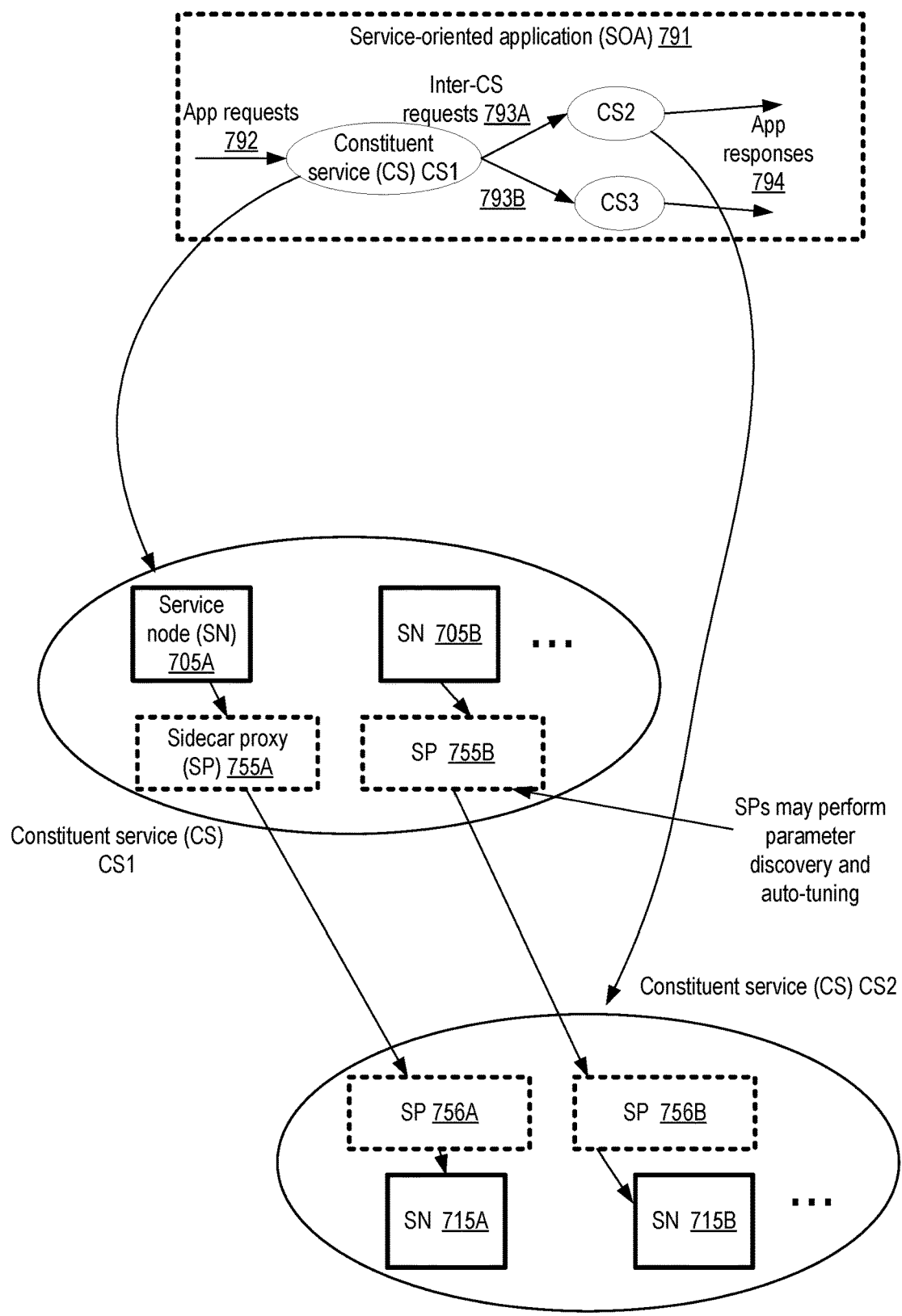
FIG. 7 illustrates an example scenario in which intermediary devices configured to auto-tune networking configuration settings may be used for processing inter-constituent-service traffic of a distributed application, according to at least some embodiments.

FIG. 7 illustrates an example scenario in which intermediary devices configured to auto-tune networking configuration settings may be used for processing inter-constituent-service traffic of a distributed application, according to at least some embodiments. Some distributed applications, referred to as service-oriented applications (SOAs) or applications implementing service-oriented architectures, may be designed as collections of constituent services, with each constituent service being implemented at a respective set of nodes. Different subsets of a given application's overall functionality may be executed at respective lower-level self-contained services referred to as constituent services of the application. Service-oriented architectures may be employed for a variety of reasons—e.g., to enable different design and development teams to focus independently on discrete units of functionality (each implemented as a separate constituent service) which may require different skill sets than other units, to help achieve faster rollouts of updates, and so on. The constituent services may also be referred to as micro-services/microservices, internal services, or sub-services. Each constituent service may be implemented using a respective set of resources such as a collection of virtual or physical machines, and may be assigned a respective internal service name (not exposed to clients of the application) to facilitate inter-constituent-service communications.

Example service oriented application 791 of FIG. 7 comprises three constituent service CS1, CS2 and CS3, which collectively perform the computations required to produce an application response 794 to each application request 792. To accomplish a given task at an SOA 791 in response to an application request 792, network messages (e.g., messages 793A, 793B or 793C) may sometimes have to be transmitted between the nodes of different constituent services. When owners of distributed applications use such service-oriented architectures, they are typically faced with a number of cross-cutting concerns. At a minimum, they need to address service discovery, liveness and load-balancing: each constituent service needs to know how to reach its downstream dependencies, which of the nodes of various constituent services are healthy, and how to fairly distribute requests across those nodes. Increasingly, concerns like request tracing, location-based affinity, authentication and authorization, load shedding, backpressure, and support for blue/green deployments are also becoming important.

Depending on the dimension they want to optimize with respect to the cross-cutting concerns, application owners typically choose one of two approaches. In one such approach, application owners set up respective load balancers for each constituent service, and send all service-to-service requests via such load balancers. In this approach, cross-cutting concerns have to be implemented by the load balancers. Since load balancers have limited knowledge about upstream clients, not every cross-cutting concern can be supported in this approach. In an alternative approach, known as "service mesh," a piece of software (called a sidecar proxy) may be set up by application owners alongside every instance of their service. Incoming and outgoing service-to-service requests among constituent services may be routed through such proxies, and the proxies may help to implement the cross-cutting concerns. Such proxies form a "mesh" that is aware of how to route requests between individual constituent services, what tracing or monitoring features should be turned on, and so on. This second approach is more flexible than the load balancer based approach mentioned above. In the embodiment depicted in FIG. 8, for example, sidecar proxies (SPs) 755A and 755B may be established to process network traffic generated at service nodes 705A and 705B of CS1, while SPs 756A and 756B may be assigned for managing inter-constituent-service traffic for service nodes 715A and 715B of CS2. Similar sets of sidecar proxies may be established for the service nodes of CS3.

In at least some embodiments, sidecar proxies 755 and/or 756 may represent one category of TPIDs discussed earlier, and in that role perform discovery of unadvertised networking parameters of the nodes of the constituent services of a distributed application with which they communicate. The sidecar proxies may use the discovered networking parameters values to automatically tune their own parameters in at least some embodiments. In at least one embodiment, a provider network may include a traffic processing service which implements managed sidecar proxy functionality for service oriented applications. Such a service may allow owners of distributed applications to use multi-tenant resources to implement sidecar proxy functions, instead of having to configure the sidecar proxies on their own.

Example Programmatic Interactions

Figure 8:
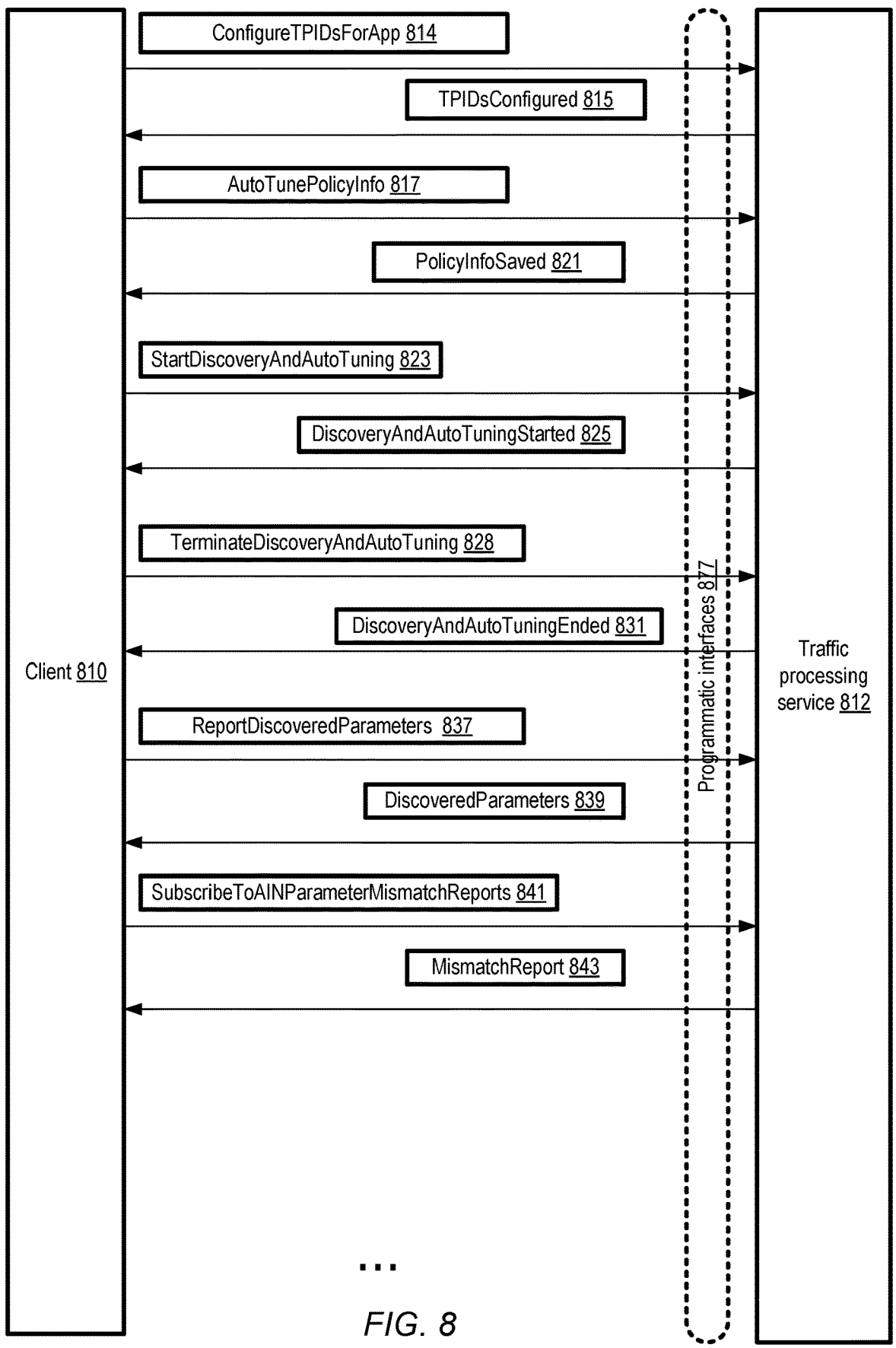
FIG. 8 illustrates example programmatic interactions pertaining to auto-tuning of networking configuration settings, according to at least some embodiments.

As mentioned in the context of FIG. 1, a traffic processing service may implement a set of programmatic interfaces which can be used by clients to submit requests associated with the tasks which the clients wish to have performed on their behalf by the service, and receive corresponding responses. FIG. 8 illustrates example programmatic interactions pertaining to auto-tuning of networking configuration settings, according to at least some embodiments. A client 810 of a TPS 812, similar in features and functionality to TPS 110 of FIG. 1, may utilize programmatic interfaces 877 of the TPS to submit a ConfigureTPIDsForApp request 814 in the depicted embodiment. The request 814 may, for example, indicate the number of TPIDs required, the kinds of traffic processing (e.g., load balancing, message format transformation, encapsulation/de-capsulation, etc.) which are to be performed, the set of AINs to which the TPIDs should direct traffic, the set of clients from which requests are expected at the TPIDs, and so on. The requested TPID configuration information may be stored at a repository of the TPS 812, and a TPIDsConfigured message 815 may be sent to the client 810 to indicate that the requested TPIDs have been established in some embodiments.

The client 810 may submit an AutoTunePolicyInfo message 817 in the depicted embodiment, indicating (a) that automated discovery and self-tuning of networking parameters is to be performed by the TPIDs configured for the client (e.g., by all of the TPIDs set up for the client, or by a subset), (b) the set of parameters whose values are to be discovered and auto-tuned, and/or (c) the discovery techniques to be employed. The specific types of modifications to be made with respect to the TPIDs' parameters, such as which specific parameter is to be modified in response to detecting a value of an AIN parameter which satisfies a threshold, and whether the TPID parameter is to be set to match the AIN parameter, exceed the AIN parameter (and if so, by how much), or be kept below the AIN parameter (and if so, by how much), may be indicated in the policy information. With respect to the discovery techniques, additional details may be specified in at least some embodiments in the AutoTunePolicyInfo message, such as how often the parameter values are to be detected, whether discovery techniques are to be implemented only under specified workload conditions such as when the rate of client requests remains below a threshold for some time period, whether a modified health management protocol is to be used for parameter discovery, and so on. The auto tuning policy information may be stored at the TPS, and a PolicyInfoSaved message 821 may be sent to the client in some embodiments.

After the automated tuning policy information has been provided, a client may submit a StartDiscoveryAndAutoTuning request 823 in the depicted embodiment, causing the implementation of the policy to be initiated by the TPS. After the TPS causes the TPIDs set up for the client to start discovery of parameters and auto-tune themselves accordingly, a DiscoveryAndAutoTuningStarted message 825 may be sent to the client by the TPS in some embodiments. Similarly, if at some point the client 810 wishes to discontinue auto-tuning, a TerminateDiscoveryAndAutoTuning request 828 may be sent to the TPS. The TPS may then cause the TPIDs to stop further implementation of the automated tuning techniques, and send a DiscoveryAndAutoTuningEnded message 831 to the client in the depicted embodiment.

In some embodiments, a client 810 may request values of the discovered parameters by sending a ReportDiscoveredParameters request 837, and the values may be provided by the TPS in a DiscoveredParameters message 839. In at least one embodiment, a client may wish to be informed if/when mismatches are discovered between the values of a given parameter at different AINs. The client may submit a SubscribeToAINParameterMismatchReports request via programmatic interfaces 877. In response, if and when mismatched AIN parameters are detected by the TPIDs, a MismatchReport 843 may be transmitted to the client 810. It is noted that other types of programmatic interactions pertaining to auto-tuning of networking configuration parameters, not shown in FIG. 8, may be supported in at least some embodiments.

Example Provider Network Environment

Figure 9:
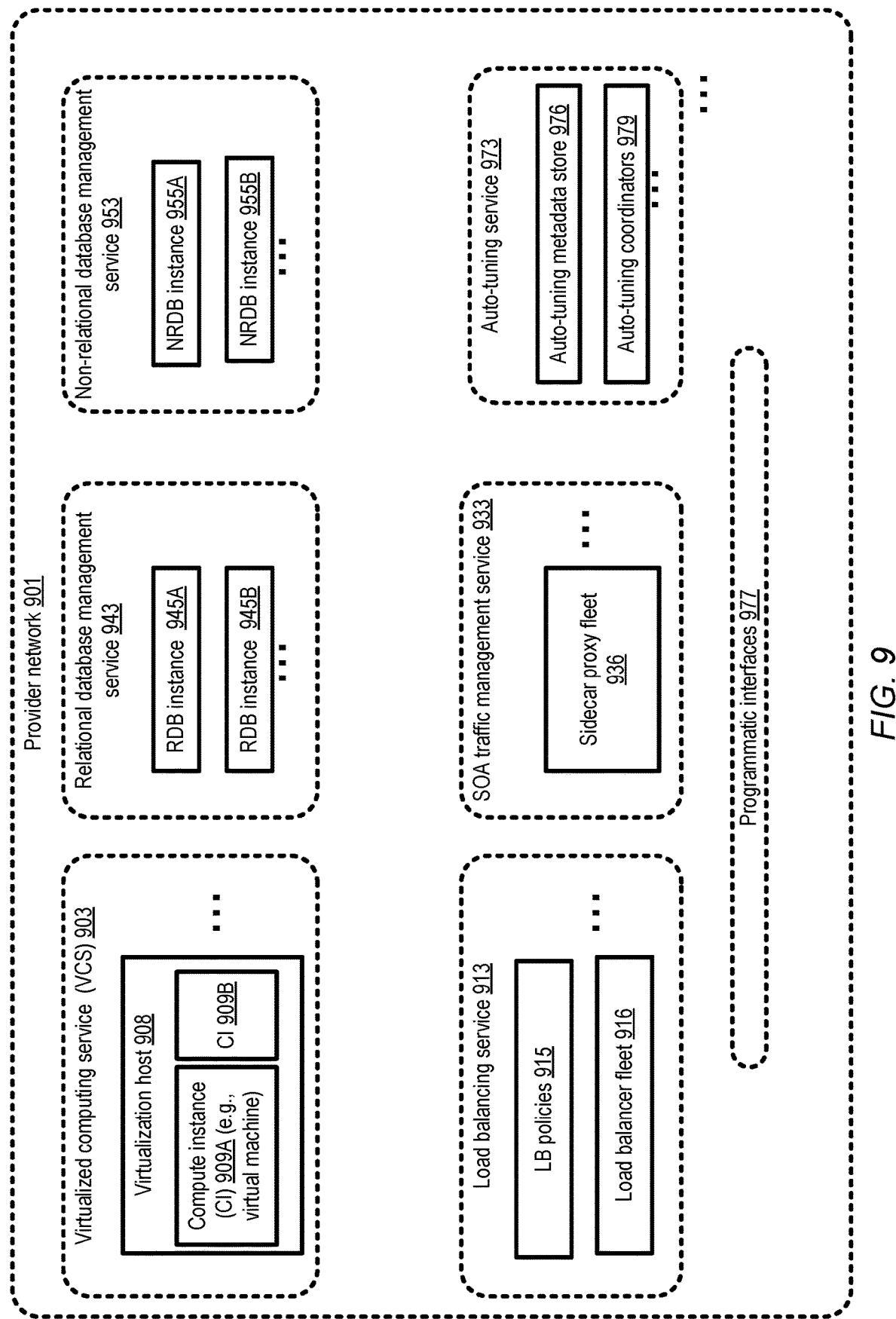
FIG. 9 illustrates an example provider network environment in which networking configuration settings of network intermediary devices may be tuned automatically, according to at least some embodiments.

FIG. 9 illustrates an example provider network environment in which configuration settings of network intermediary devices may be tuned automatically, according to at least some embodiments. In the depicted embodiment, provider network 901 may comprise resources used to implement a plurality of publicly-accessible services accessible over the Internet and other types of networks, including for example a virtualized computing service (VCS) 903, a relational database management service 943, a non-relational database management service 953, a load balancing service 913, a service-oriented application traffic management service 933, and an auto-tuning service 973. The VCS 903 may comprise a plurality of virtualization hosts 908, each of which may be used to implement one or more compute instances 909 (e.g., CIs 909A and 909B, at least some of which may comprise respective virtual machines) at which VCS clients may run various types of applications. The relational database management service 943 may comprise numerous instances 945 (e.g., RDB instance 945A or 945B) of relational databases set up on behalf of clients; similarly, the non-relational database management service 953 may comprise numerous non-relational database instances 955 (e.g., NRDB instances 955A or 955B).

Clients of the provider network 901 may utilize compute instances 909 and/or instances of the database services 943 or 953 as application implementation nodes (AINs) similar to AINs 125 of FIG. 1 in some embodiments. Nodes of constituent services of service-oriented applications (similar to nodes 705 and 715 of FIG. 7) may also be implemented using the resources of the VCS and/or the database services 943 and 953 in the depicted embodiment. Clients may use the load balancing service 913 to acquire load balancers of fleet 916 in the depicted embodiment to serve as intermediary devices for AINs implementing the clients' applications, and indicate the specific load balancing policies 915 to be employed for their applications. SOA traffic management service 933 may be employed to configure managed sidecar proxies from fleet 936, similar in functionality to SPs 755 and 756 of FIG. 7 for applications implementing service-oriented architectures. Generally speaking, components of a given service of provider network 901 may utilize components of other services in the depicted embodiment. Individual ones of the services shown in FIG. 9 may implement a respective set of programmatic interfaces 977 which can be used by external and/or internal clients (where the internal clients may comprise components of other services) in the depicted embodiment.

In some embodiments, load balancers of fleet 913 and/or sidecar proxies of fleet 936 may be configured to perform automated discovery and tuning of networking configuration parameters using the kinds of techniques discussed above. In at least one embodiment, an auto-tuning service 973 may be used by provider network clients to coordinate the automated parameter discovery and tuning operations. For example, a client of the auto-tuning service 973 may specify (e.g., using programmatic interactions similar to those discussed in the context of FIG. 8) their application implementation nodes and intermediary device configuration as well as auto-tuning requirements. The configuration information and requirements may be stored at metadata store 976, and auto-tuning coordinators 979 may communicate with the intermediary devices set up for the applications to trigger discovery and tuning of networking parameters in the depicted embodiment. Note that at least in some embodiments, automated discovery of networking parameters and associated auto-tuning of intermediary device parameters may be implemented without using provider network resources—e.g., a set of standalone computing devices which are not part of a provider network service may be used.

Methods for Automated Tuning of Networking Configuration Settings

Figure 10:
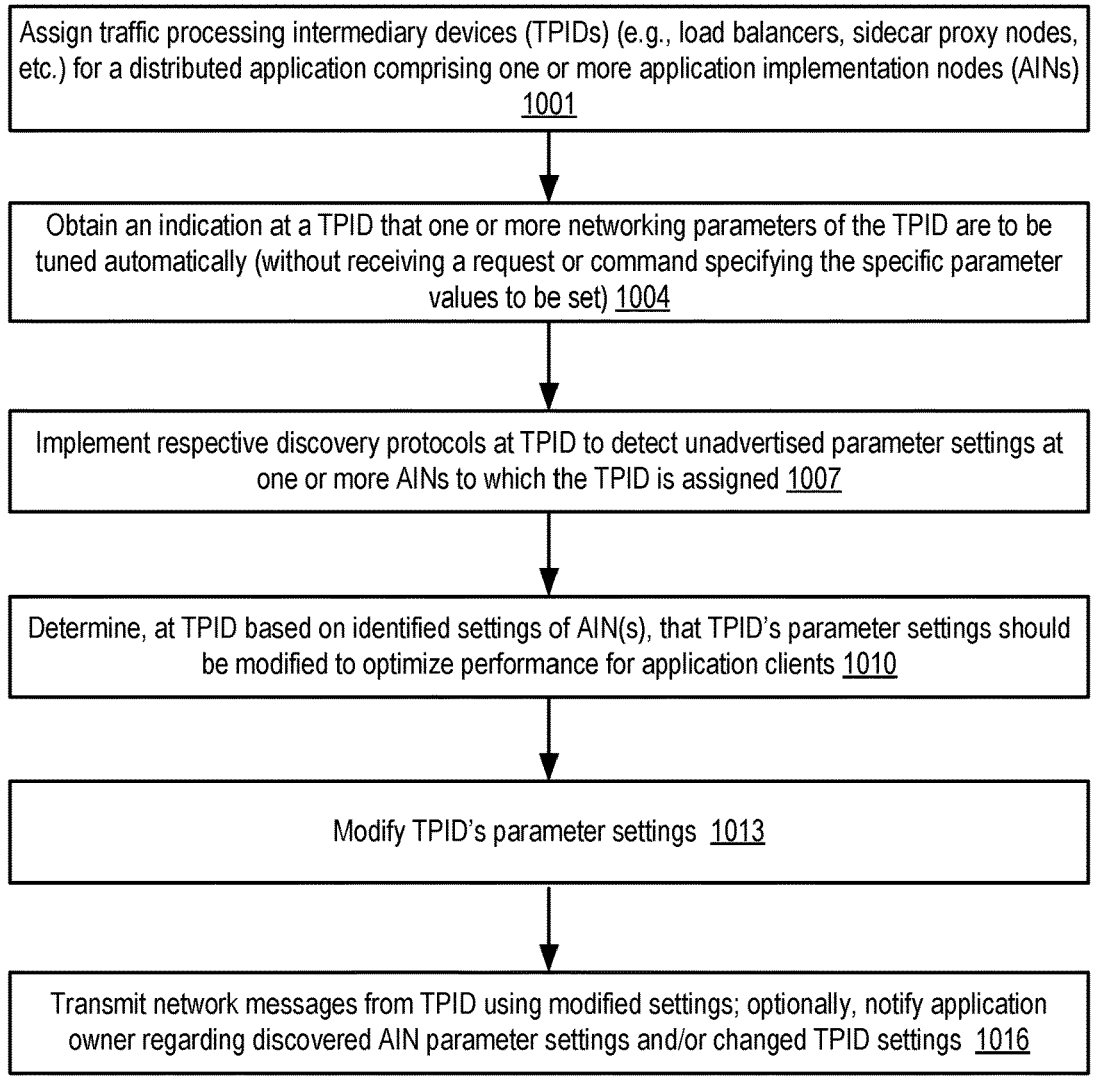
FIG. 10 is a flow diagram illustrating aspects of operations that may be performed to support automated tuning of networking configuration settings, according to at least some embodiments.

FIG. 10 is a flow diagram illustrating aspects of operations that may be performed to support automated tuning of networking configuration settings, according to at least some embodiments. As shown in element 1001, one or more traffic processing intermediary devices (TPIDs) may be assigned for handling request and response messages of a distributed application comprising one or more AINs. The TPIDs may, for example receive client requests submitted over a first group of network paths (which may include portions of the public Internet in some cases), submit corresponding internal requests to selected AINs over a second group of network paths (which may include internal or private network pathways of a provider network, which may be faster than public Internet paths), receive response generated at the AINs over the second group of network paths, and transmit messages containing the responses back to the clients over the first group of network paths. A number of different types of traffic processing may be implemented at the TPIDs in different embodiments, including for example load balancing, address translation, message format transformation, encapsulation protocol processing, and so on. In at least some embodiments the TPIDs may be part of a traffic processing service (TPS) of a provider network.

A TPID may obtain an indication that one or more networking parameters of the TPID are to be tuned automatically without receiving the specific values to be used for the parameters in a request or command (element 1004), e.g., from a control plane component of the TPS at which the TPIDs are implemented in the depicted embodiment. In at least one embodiment, a client of the TPS may request that auto-tuning be implemented at the TPIDs assigned to the client's AINs, and the TPID may be informed by the TPS control plane regarding the client's request. Note that neither the client nor the TPS control plane may inform the TPID about specific values to which the parameters are to be set in various embodiments.

The TPID may implement respective discovery protocols to detect unadvertised networking parameter settings at one or more AINs to which the TPID was assigned in the depicted embodiment (element 1007). The discovery protocols may, for example, utilize modifications of existing health state management techniques in which the TPID deliberately does not send acknowledgements for segments received from the AINs, waiting for idle connections to be timed out, detecting the sizes of request bursts which lead to dropped requests, and so on. Techniques that do not impact customer workloads substantially may be used for the discovery in at least some embodiments—e.g., the TPID may avoid using the discovery mechanisms during periods in which the client-submitted request rates are above a threshold. Any of a variety of unadvertised AIN parameter settings whose values are not indicated in messages or headers sent by the AINs, and are not indicated during connection establishment, may be determined in different embodiments, including TCP congestion control parameters, HTTP timeout intervals, request throttling parameters, and so on.

After detecting or deducing the AIN parameter values, the TPID may determine whether one or more of the TPID's own parameter settings should be modified in various embodiments (element 1010), e.g., by comparing the AIN parameter settings with its own. For example, for some parameters, the TPID's setting may ideally be set to the same value as the value used at the AIN; for other parameters, the TPID's settings should be set higher than or lower than the corresponding setting at the AIN to obtain the best possible overall application performance from the clients' perspective, or to avoid errors being generated in response to client requests. In some embodiments, for example, guidelines on how the TPID's settings should be modified based on AIN settings may be provided to a TPID by the TPS control plane and/or by clients via the TPS control plane.

If the parameter value analysis or comparison performed by the TPID indicates that one or more of its own parameters should be modified, a respective new value for each such parameter may be determined by the TPID, and the parameter settings may then be modified (element 1013). In at least one embodiment, after discovering the value of an unadvertised parameter P1, a different parameter P2 (which may be related to or affected by the P1 settings) may be automatically modified by the TPID. Subsequent messages from the TPID (including data segments and/or acknowledgements) may be sent in accordance with the modified settings (element 1016). In at least one embodiment, the TPID may notify application owners (e.g., TPS clients for whose applications the TPIDs and AINS are used) regarding discovered AIN settings and/or changed TPID settings.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The automated tuning techniques described above may be extremely useful in a variety of scenarios. Many applications utilize traffic processing intermediaries such as load balancers, address translators, packet transformers, and the like for traffic flowing between application clients and back-end servers. Often, the applications comprise complex graphs of nodes or micro-services communicating with each other via intermediaries. If networking configuration settings in one part of a distributed complex application are set up in a sub-optimal manner, this can potentially have a substantial negative impact on the system as a whole, affecting client-perceived performance and in some cases causing unnecessary errors due to timeouts and the like. The propose techniques could help alleviate or eliminate many such misconfigurations with very little overhead.

Illustrative Computer System

Figure 11:
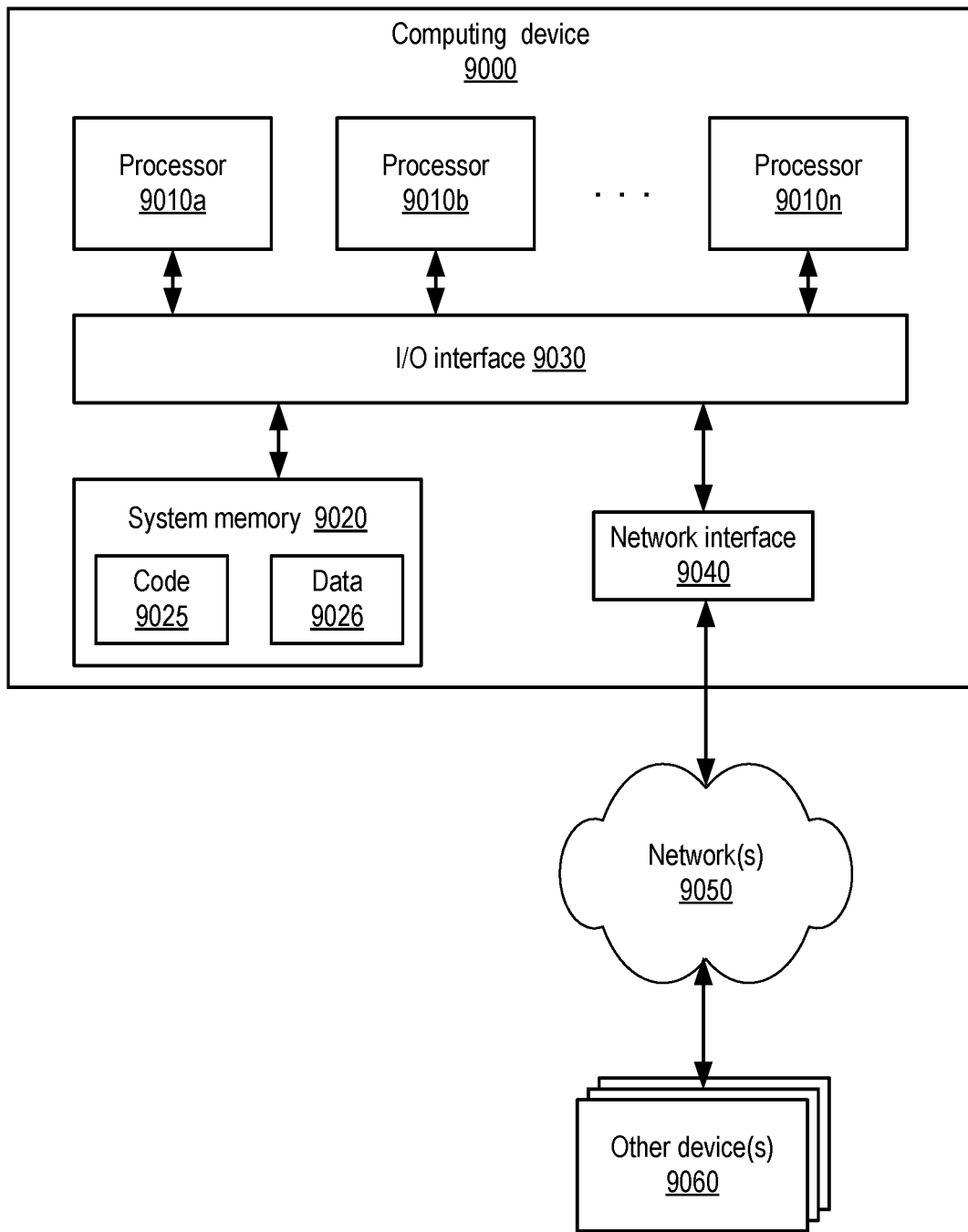
FIG. 11 is a block diagram illustrating an example computing device that may be used in at least some embodiments.

In at least some embodiments, a server that implements the types of techniques described herein (e.g., various functions of traffic processing intermediaries including load balancers and sidecar proxies, content delivery networks, application implementation nodes, provider network services, and the like), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and/or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040.

Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include one or more processors and associated memory configured via executable instructions that upon execution on or across the one or more computing devices cause the one or more computing devices to:
   assign one or more intermediary devices for processing network traffic of a distributed application comprising one or more application implementation nodes, wherein an intermediary device of the one or more intermediary devices is configured at least to: (a) obtain, via a first set of one or more network connections, one or more operation requests originating at a client of the distributed application, (b) transmit, via a second set of one or more network connections, one or more messages representing an operation request of the one or more operation requests to at least one application implementation node and (c) transmit, to the client via the first set of one or more network connections, one or more messages comprising a response generated to an operation request at an application implementation node;
   obtain, at the intermediary device, an indication that automated tuning of one or more networking parameters is to be performed at the intermediary device;
   identify, by the intermediary device in response to the indication, a respective unadvertised value of one or more networking parameters of at least a particular application implementation node of the distributed application, wherein the respective unadvertised values are (a) not indicated in messages comprising responses to operation requests and (b) not indicated in a connection establishment workflow of the second set of connections;
compare, by the intermediary device, an identified unadvertised value of a networking parameter of the particular application implementation node with a value of a corresponding networking parameter of the intermediary device;
automatically modify, by the intermediary device, based at least in part on the comparison, the value of the corresponding networking parameter, without receiving a request to perform the modification, wherein modifying the corresponding networking parameters decreases a number of round trip times of the one or more network messages between the client of the distributed application and the intermediary device or decreases number of error messages sent to the client from the intermediary device based on the network messages; and
transmit, by the intermediary device, the one or more network messages in accordance with the automatically modified networking parameter value.

2. The system as recited in claim 1, wherein the intermediary device comprises a resource of a first service of a provider network, and wherein the particular application implementation node comprises a resource of a second service of the provider network, wherein a set of permissions enabling a client of the second service to change parameter settings of the particular application implementation node does not enable the client to change parameter settings of the intermediary device.

3. The system as recited in claim 1, wherein a network parameter whose value is identified by the intermediary device comprises one of: (a) a congestion control parameter, (b) a connection timeout parameter, or (c) a workload throttling parameter.

4. The system as recited in claim 1, wherein to identify an unadvertised value of a networking parameter of the one or more networking parameters, the one or more computing devices include further instructions that upon execution on or across the one or more computing devices further cause the one or more computing devices to:
compute a number of additional network messages which are transmitted by the particular application implementation node to the intermediary device (a) after the particular application implementation node sends a particular network message to the intermediary device and (b) before the particular application implementation node re-sends the particular network message to the intermediary device, wherein the re-sending is triggered by an absence of an acknowledgement of the particular network message from the intermediary device.

5. The system as recited in claim 1, wherein to identify an unadvertised value of a networking parameter of the one or more networking parameters, the one or more computing devices include further instructions that upon execution on or across the one or more computing devices further cause the one or more computing devices to:
determine the time taken by the particular application implementation node to close an idle connection.

6. A computer-implemented method, comprising:
determining, by an intermediary device configured for request and response traffic of a distributed application comprising one or more application implementation nodes, an unadvertised networking parameter setting of at least a particular application implementation node of the one or more application implementation nodes of the distributed application;
automatically modifying, by the intermediary device, based at least in part on the determined unadvertised networking parameter setting of the particular application implementation node, one or more networking parameters of the intermediary device, wherein modifying the one or more networking parameters of the intermediary device decreases a number of round trip times of one or more network messages between a client of the distributed application and the intermediary device or decreases number of error messages sent to the client from the intermediary device based on the network messages; and
transmitting, by the intermediary device, the one or more network messages in accordance with the one or more automatically modified networking parameters.

7. The computer-implemented method as recited in claim 6, wherein a set of permissions enabling the client to change parameter settings of the particular application implementation node does not enable the client to change parameter settings of the intermediary device.

8. The computer-implemented method as recited in claim 6, wherein the unadvertised network parameter comprises one of: (a) a congestion control parameter, (b) a connection timeout parameter, or (c) a workload throttling parameter.

9. The computer-implemented method as recited in claim 6, wherein determining the unadvertised networking parameter setting comprises:
computing a number of additional network messages which are transmitted by the particular application implementation node to the intermediary device (a) after the particular application implementation node sends a particular network message to the intermediary device and (b) before the particular application implementation node re-sends the particular network message to the intermediary device, wherein the re-sending is triggered by an absence of an acknowledgement of the particular network message from the intermediary device.

10. The computer-implemented method as recited in claim 6, wherein the intermediary device is configured to send health status probe messages to the particular application implementation node, wherein responses to the health status probe messages are used to determine the health state of the particular application implementation node, and wherein determining the unadvertised networking parameter setting comprises:
transmitting a modified version of a health status probe message by the intermediary device to the particular application implementation node.

11. The computer-implemented method as recited in claim 6, wherein determining the unadvertised networking parameter setting comprises:
determining the time taken by the particular application implementation node to close an idle connection.

12. The computer-implemented method as recited in claim 6, wherein determining the unadvertised networking parameter setting comprises:
examining the responses of the particular application implementation node to a burst of request messages from the intermediary device.

13. The computer-implemented method as recited in claim 6, further comprising:

obtaining, via a programmatic interface, a request for automated tuning of networking parameters of the intermediary device, wherein the determining of the unadvertised networking parameter setting is responsive to the request.

14. The computer-implemented method as recited in claim 6, wherein the intermediary device comprises a load balancer.

15. The computer-implemented method as recited in claim 6, wherein the network intermediary is a content server of a content delivery network (CDN).

16. One or more non-transitory computer-accessible storage media storing program instructions that when executed on or across one or more processors cause the one or more processors to:

detect, by an intermediary device configured for request and response traffic of a distributed application comprising one or more application implementation nodes, an unadvertised networking parameter setting of at least a particular application implementation node of the one or more application implementation nodes of the distributed application;

compute, by the intermediary device, a new value to be used for a networking parameter of the intermediary device, based at least in part on the detected unadvertised networking parameter setting; and set, by the intermediary device, the networking parameter of the intermediary device to the new value, wherein setting the networking parameter of the intermediary device to the new value decreases number of round trip times of one or more network messages between a client of the distributed application and the intermediary device or decreases number of error messages sent to the client from the intermediary device based on the network messages.

17. The one or more non-transitory computer-accessible storage media as recited in claim 16, wherein the application comprises a first set of application implementation nodes implemented at a first constituent service and a second set of application implementation nodes at a second constituent service, and wherein the intermediary device comprises a sidecar proxy assigned to process requests originating at the first constituent service and directed to the second constituent service.

18. The one or more non-transitory computer-accessible storage media as recited in claim 16, storing further program instructions that when executed on or across the one or more processors cause the one or more processors to:

determine, by an intermediary device, that the setting of the unadvertised networking parameter of another application implementation node of the one or more application implementation nodes differs from the setting of the unadvertised networking parameter of the particular application implementation node; and causing a notification of the difference to be transmitted.

19. The one or more non-transitory computer-accessible storage media as recited in claim 16, storing further program instructions that when executed on or across the one or more processors cause the one or more processors to:

transmit, to another intermediary device configured for request and response traffic of the application, a request to modify the other intermediary device's networking parameter to the new value.

20. The one or more non-transitory computer-accessible storage media as recited in claim 16, wherein the networking parameter comprises one or more of:

(a) a congestion control parameter, (b) a connection timeout parameter, or (c) a workload throttling parameter.

* * * * *